(12) United States Patent
Pham

(10) Patent No.: US 6,876,746 B2
(45) Date of Patent: Apr. 5, 2005

(54) ENCRYPTION/DECRYPTION ENGINE FOR MULTIPLE ISOCHRONOUS DATA STREAMS

(75) Inventor: Steve Pham, Milpitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 487 days.

(21) Appl. No.: 09/859,212

(22) Filed: May 15, 2001

(65) Prior Publication Data

US 2002/0172357 A1 Nov. 21, 2002

(51) Int. Cl.$^7$ .............................. H04L 9/18; H04K 1/06; G06F 3/14
(52) U.S. Cl. ............................ 380/42; 380/37; 380/43; 708/135
(58) Field of Search ........................... 380/37, 42, 43, 380/205, 210, 212, 252; 708/135

(56) References Cited

U.S. PATENT DOCUMENTS

| | | | |
|---|---|---|---|
| 6,189,095 B1 | 2/2001 | Coppersmith et al. | ...... 713/150 |
| 6,195,368 B1 | 2/2001 | Gratacap | ...... 370/535 |
| 6,275,878 B1 * | 8/2001 | Yashima et al. | ...... 710/61 |

FOREIGN PATENT DOCUMENTS

| | | | | |
|---|---|---|---|---|
| JP | 363255675 A | * | 10/1988 | ...... G01S/7/32 |
| JP | 406245086 A | * | 9/1994 | ...... H04N/1/44 |

OTHER PUBLICATIONS

M. Oomori, JP 06–245086 A, "Encoding and Decoding Method," Sep. 2, 1994, Japan Patent Office, Computer Translation into English. Retrieved from the Internet:<URL: http://www.ipdl.jpo.go.jp/homepg_e.ipdl>.*

Forensic Translation into English of Ricoh Co., Ltd. (Omori), "Encoding and Decoding Method," Japan Unexamined Patent Publication No. 6–245086 A, Sep. 2, 1994.*

* cited by examiner

Primary Examiner—Justin T. Darrow
(74) Attorney, Agent, or Firm—Charles J. Kulas; Carpenter & Kulas, LLP

(57) ABSTRACT

Buffers, or registers, are used at one or more places between processing stages in a device for decrypting a data stream. The device has multiple processing stages arranged in a circular manner so that data is repeatedly passed from a prior stage to a next stage, and from a last stage back to a first stage, until processing is completed. The use of one or more registers at one or more positions allows data to be stored so that the stream associated with the stored data can effectively be suspended. This allows data from another stream to be processed while the suspended stream is in a wait state.

12 Claims, 4 Drawing Sheets

ENCRYPTION/DECRYPTION ENGINE FOR MULTIPLE ISOCHRONOUS DATA STREAMS

BACKGROUND OF THE INVENTION

This invention relates in general to encryption/decryption devices and more specifically to a decryption device capable of handling multiple independent data streams in a time-multiplexed fashion.

As information is increasingly handled in digital formats it becomes ever more important to provide security safeguards for these formats. For example, digital video has very demanding requirements in the need to restrict access. Formats such as the IEEE 1394 Standard for isochronous data transfer, Motion Picture Experts Group (MPEG) standards and high-definition television (HDTV) standards along with access, transfer and processing standards as promulgated by such organizations as Digital Transmission Licensing Administrator (DTLA—see, e.g., www.dtca.com) have imposed performance levels for devices using encryption and decryption on standardized digital formats. Because of the complex nature of encryption and decryption processing, and the extremely high bandwidth requirements of digital video, it is difficult to design circuits that can meet all of the requirements.

FIG. 1A shows a prior art encryption/decryption device.

In FIG. 1A, a data stream, such as an IEEE 1394-compliant data stream 10 is input into the left side of the device's circuitry as "chunks" of 64-bit words. Key 12 can be a variable-length word that is also input into the device as shown in FIG. 1A. The device includes several stages where each stage includes an exclusive or (XOR) 14 function followed by an addition operation 16. This process is repeated for a total of five stages as shown in FIG. 1A. At the end of the fifth stage, the result from adder 18 is looped back to the input of XOR 14.

Each cycle through the five stages completes a "round" through the device. Typically, multiple rounds are required. For example, a device may require ten rounds before either the encryption or decryption function is complete for the respective word.

This design can be referred to as a "circular arrangement" of multiple "processing stages." Each processing stage, such as 14 and 16, are arranged so that the output of a preceding stage is fed to the input of a succeeding stage. In other words, processing stage 14 performs its XOR operation on a data word and then passes the result to processing stage 16 where an addition is performed. In this case, since the application is an encryption or decryption device, each stage also is provided with the key and each operation is a two-operand operation.

Note that applications other than encryption and decryption may use similar architecture.

It should be apparent that the ten rounds of processing through five stages where each stage includes multiple operations represents many cycles of processing for just a single 64-bit word. Naturally, a video stream is made up of many millions, trillions, or more, words of data that need to be processed in this multi-round manner.

Typically, the encryption process starts and ends at the boundary of a block of data. The block of data is called an "encryption frame." Processing of a next encryption frame can only commence after completion of processing of a current frame. In other words, it is not possible to interleave the processing of encryption frames. This means that a prior art approach, such as shown in FIG. 1A, does not allow for efficient concurrent processing of multiple data streams.

To further complicate efficient encryption/decryption of streams, it is typical in digital video applications that encryption frames are arbitrarily split into smaller data blocks. These data blocks can then be transferred over a communication link over varying periods of time and with varying intervals between block transmissions. This means that the start and end of an encryption frame of one data stream does not necessarily align with the frame from another stream. For this reason, the circuit of FIG. 1A is dedicated for real-time processing of a single data stream. To handle a second stream, another similar circuit would have to be employed.

FIG. 1B shows a time line where two prior art circuits of FIG. 1A are used.

In FIG. 1B, two input streams are processed as stream A and stream B. Each stream must be independently processed with two separate encryption circuits. The need for two circuits increases the complexity and size of the hardware necessary to process two streams, rather than just a single stream.

Stream A and B have frames divided into multiple blocks denoted as, for example, A0, A1, A2, etc. To complete the encryption/decryption of block A0 into block A0', block A0 and parts of block A1 are used. If there is a pause in reception of block A1 then the circuit must wait until block A1 is received to complete processing for block A0'.

The uninterruptible and serial processing of the device of FIG. 1A means that it is not possible for the device to process data from stream B when it is currently processing the encryption frame of stream A.

Thus, it is desirable to provide an invention that improves upon the prior art.

SUMMARY OF THE INVENTION

An encryption device providing for time-multiplexed processing of multiple data streams. In a digital video application the device is a decryption device for an isochronous data stream such as an IEEE 1394—compliant data stream. The device uses multiple processing stages arranged in a circular fashion for processing data by passing the data through the stages multiple times, or rounds. When data reaches the last processing stage it is sent back to the first stage to begin a next round of processing. After several rounds of processing, the data is output.

Buffers, or registers, are used at one or more positions between processing stages. The use of one or more registers at a position allows data to be stored so that the stream associated with the stored data can effectively be suspended. This allows data from another stream to be processed while the suspended stream is in a wait state.

In one embodiment the invention provides a buffer coupled between at least two stages to provide for storing of at least one stage's output, and for later selectively providing the stored at least one stage's output to a successive stage.

DESCRIPTION OF THE SPECIFIC EMBODIMENTS

Figure 1A:
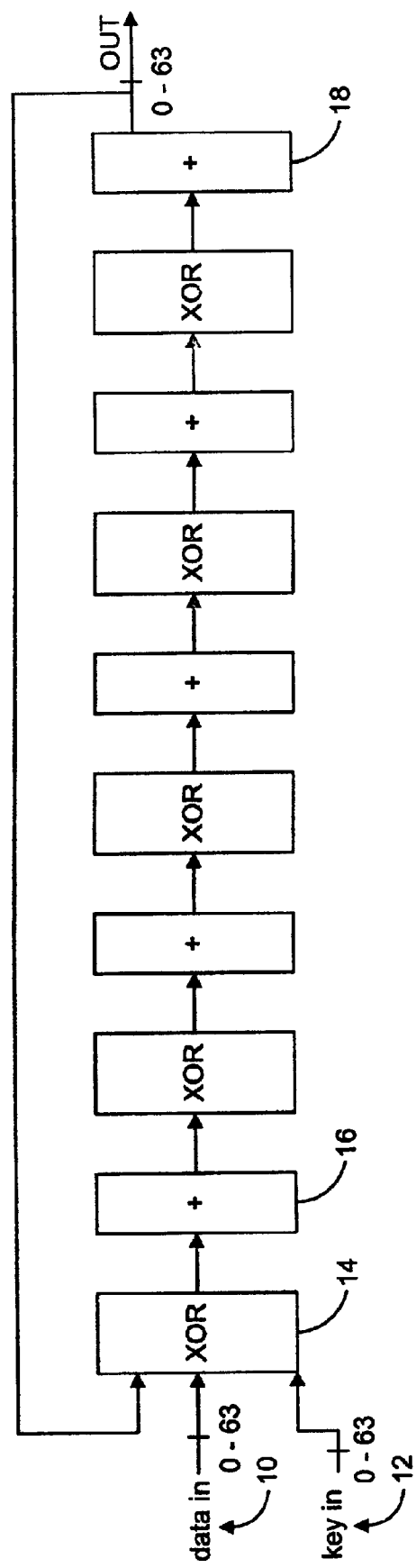
FIG. 1A shows a prior art encryption/decryption device.
Figure 1B:
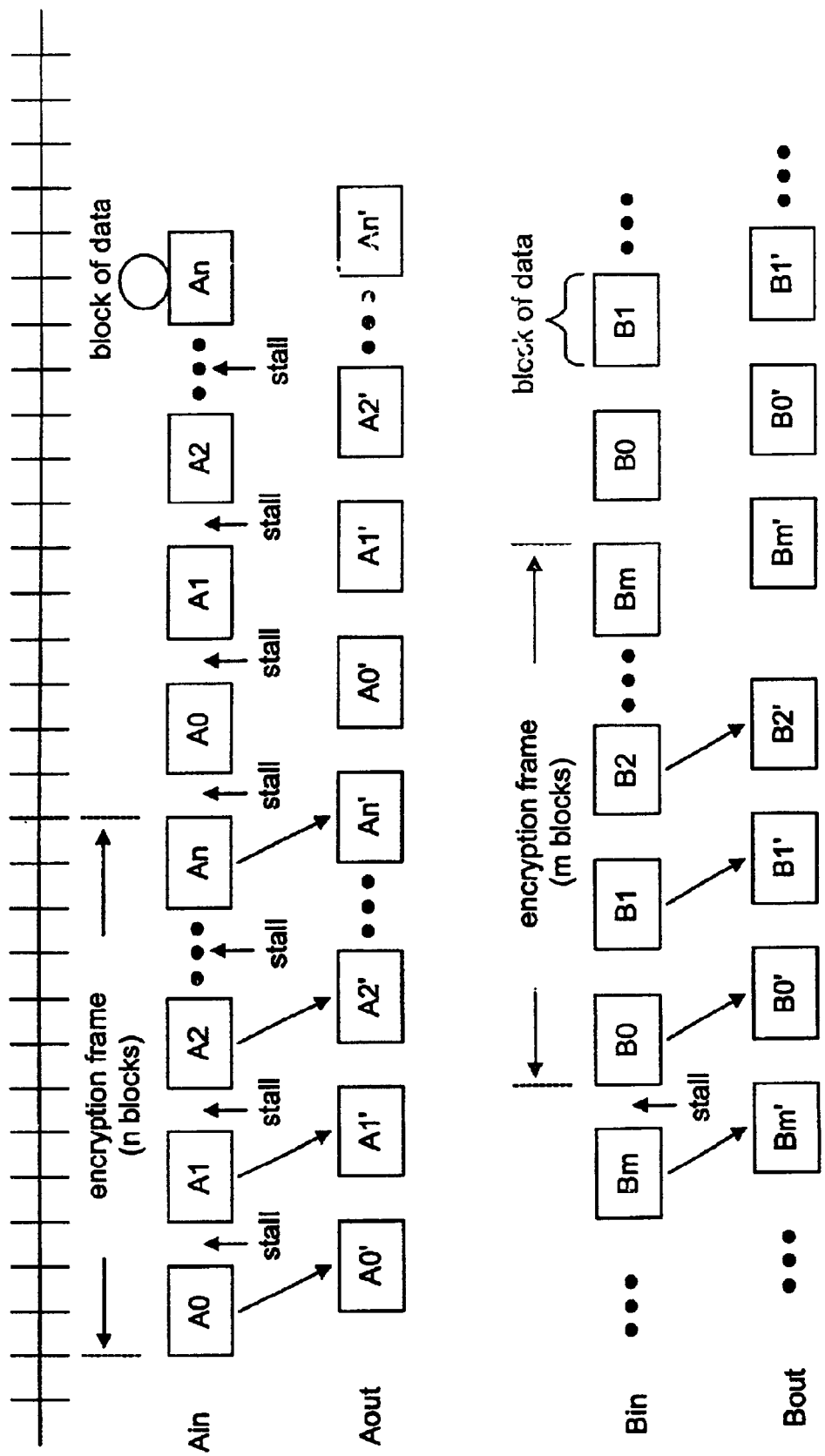
FIG. 1B shows a time line where two prior art circuits of FIG. 1A are used.
Figure 2A:
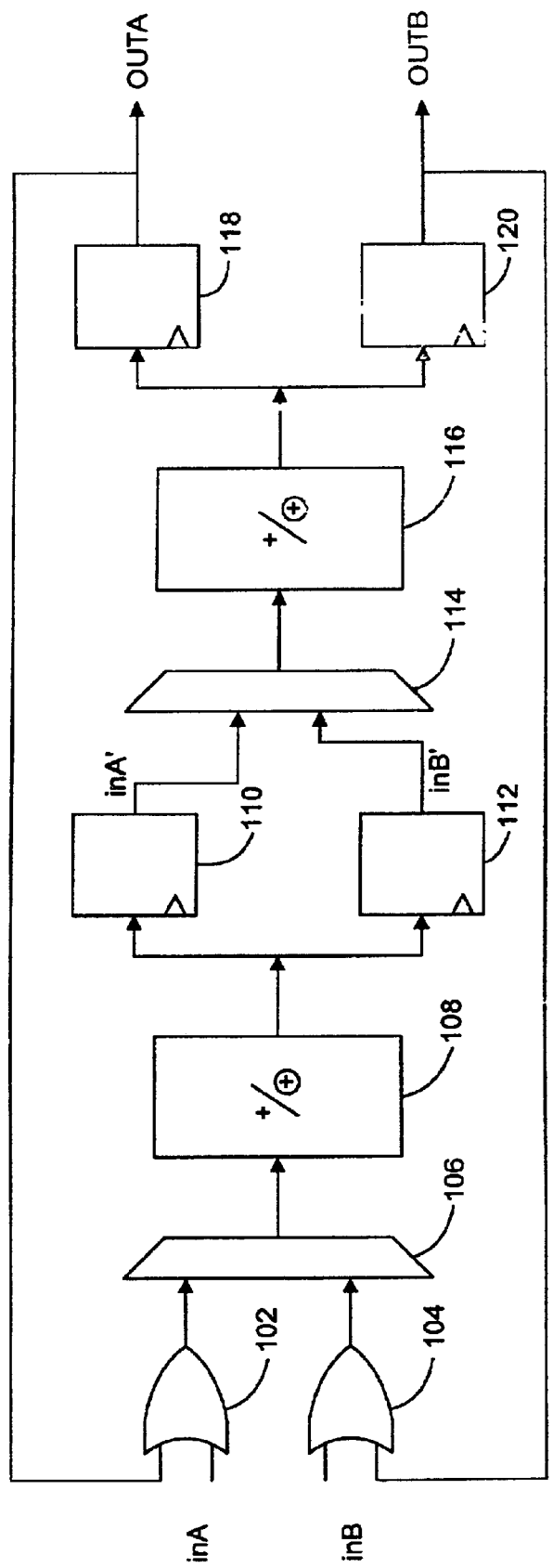
FIG. 2A shows a block diagram of a generalized device of the present invention.

FIG. 2A shows a block diagram of the generalized concept of the present invention.

In FIG. 2A, a multiple-stage digital processor is shown with the stages arranged in a circular manner. Stages 108 and 116 represent any type of digital processing stage. As will be apparent, any number of stages can be represented by stages 108 and 116.

Input is received at the left of the diagram at either of inputs $in_A$ and $in_B$ feeding XOR gates 102 and 104. The inputs are fed into multiplexer 106, which selectively applies one of the inputs to processing stage 108.

The output of processing stage 108 is selectively fed to one of two registers, or buffers, 110 and 112. Register 110 serves to store, and output, a value corresponding to $in_A$ which is referred to as $in_A'$ while register 112 receives, stores, and outputs $in_B'$.

Both outputs from registers 110 and 112 are fed to multiplexer 114. Multiplexer 114 selectively applies either $in_A'$ or $in_B'$ to processing stage 116. The output from processing stage 116 is sent, in turn, to a second set of registers 118 and 120. Again, register 118 corresponds to the A data stream while register 120 corresponds to the D data stream.

Register 118 outputs its value which is fed back through XOR gate 102 and multiplexer 106 to processing stage 108. Similarly, register 120's output is fed back to XOR gate 104 and multiplexer 106 to processing stage 108. When processing is complete for a given data word in either the A or B streams, then registers 118 and 120 output the result as $OUT_A$ or $OUT_B$.

It should be apparent that the two processing stages have been split up by register banks at the outputs of each processing stage. Also, a multiplexer is used to select one of the two data words, corresponding to either the A or B data streams, at the input of each of the processing stages. The components of FIG. 2A are controlled by signals (not shown), as is noted in the art, to allow the selection of either A-stream or B-stream processing, as desired.

For example, to process A-stream data, multiplexer 106 selects the output of XOR gate 102 while new data is applied at $in_A$. This causes the $in_A$ data to be processed by processing stage 108 and output to registers 110 and 112. Data at the input of register 110 is clocked so that a the processed $in_A$ data word from processor stage 108 is stored in register 110. This value can be stored for any length of time to suspend processing of A-stream data.

While processing of A-stream data has been suspended, it is possible to continue to process a different stream, such as stream B. While A-stream data is held in register 110, B-stream data can be output from register 112 to processing stage 116. Thus, these registers allow processing of data in one stream to be suspended in favor of processing in another stream. Although the present example uses two register banks in a simplified diagram where there are two processing stages, it should be apparent that any number of register banks can be used interspersed among any number of processing stages. As discussed below, this will give different degrees of control, and a larger number of ways to multiplex, the data streams. Further, more than two registers can exist in each register bank. For example, instead of just two registers 110 and 112 accepting output from processing stage 108 and feeding multiplexer 114, there can be many registers for handling a corresponding number of data streams.

In FIG. 2A, a preferred embodiment of the invention alternately feeds A-stream data and B-stream data to each processing stage. This allows an interleaved, time multiplexed processing of two completely separate data streams. Thus, if one stream is stalled, the other stream can continue processing.

In this interleaved, time multiplexed mode, processing stage 108 is processing A-stream data while processing stage 116 is processing B-stream data. Assuming that the stages finished their processing at the same time, the A-stream data of processing stage 108 is stored in register 110 while the B-stream data of processing stage 116 is stored in register 120. Since this processing only represents one-half of a full round in this two-processing stage device, the second half of the round has processing stage 108 processing B-stream data from register 120 while processing stage 116 processes A-stream data output from register 110.

Figure 2B:
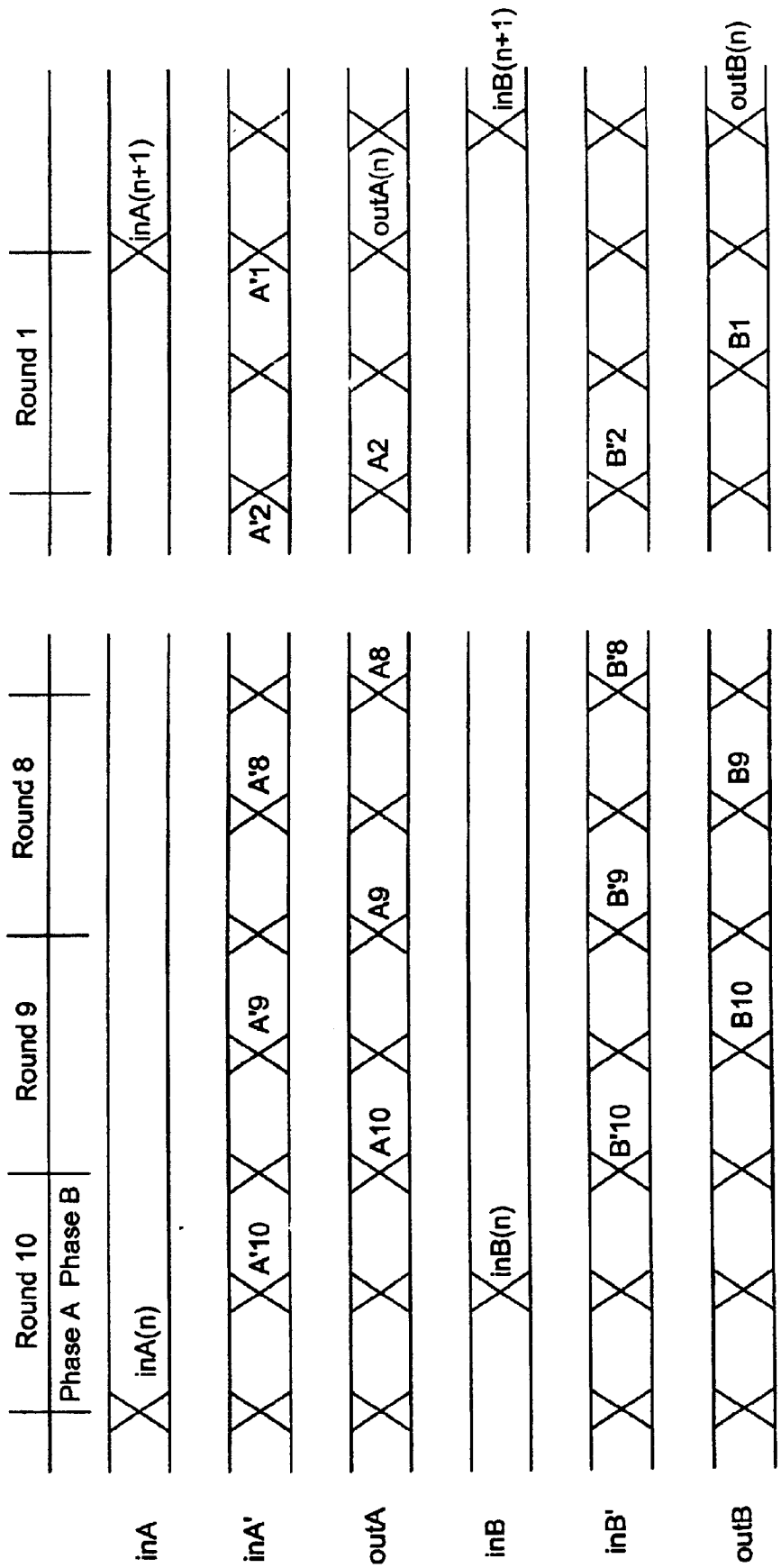
FIG. 2B illustrates time-multiplexed processing of the circuit of FIG. 2A.

FIG. 2B illustrates time multiplexed processing in diagram form.

In FIG. 2B, the chart shows timing diagrams with respect to the six signals—$in_A$, $in_A'$, $OUT_A$, $in_B$, $in_B'$ and $OUT_B$. As can be seen from FIG. 2B, the A-stream data is applied to processing stage 108 in a first one-half cycle, or phase A, while the B-stream data is applied to processor stage 108 in the second-half cycle of each round, or phase B. This means that the output of processing stage 108 provides a result for the A-stream data at the end of phase A, and provides an output for the B-stream data at the end of phase B.

The $in_A'$ row of the chart of FIG. 2B shows that register 110 has latched the A-stream data and holds it available for phase B in each round of processing. In other words, in round 10 processing (the first round), $A'_{10}$ is available during phase B at the output of register 110. Similarly, in round 9, $A'_9$ is available in phase B of round 9, etc. At the end of each round, the output of processing stage 116 is A-stream data. This data is latched into register 118 and is available as $OUT_A$. This is shown in the timing chart for the row labeled $OUT_A$. Similarly, B-stream data is processed by the second stage processor, processing stage 116, during phase A of each round so that $OUT_B$ is available at the end of phase A of each round. This can be seen by referring to the row labeled $OUT_B$ of FIG. 2B.

Thus, it should be apparent from the timing chart of FIG. 2B that the hardware shown in FIG. 2A is able to interleave, or time multiplex, two separate data streams without requiring any additional circuitry in the form of duplicate processing stages.

Although the invention has been discussed with regard to a specific embodiment thereof, it should be apparent that many variations and modifications to the preferred embodiment are possible without departing from the scope of the invention. For example, although functions for processing stages have been presented as addition, rotation, exclusive OR, it should be apparent that any type of processing can be performed by each stage and that different types of operations can be performed by different stages within the same circuit. The positioning of register banks within the multiple stages need not be symmetric with respect to the overall device. That is, a register bank can be placed one third of the way down the series of processing stages, at the end of all of the stages, etc.

Thus, the scope of the invention is to be determined solely by the appended claims.

What is claimed is:

1. A digital processing device for performing an encryption/decryption operation, comprising:

a circular arrangement of two or more processing stages, wherein each processing stage receives as input one different processing stage's output, wherein any given processing stage performs a function on digital data received at the given processing stage's input to produce the given processing stage's output;

first stage circuitry for receiving a first digital data word, performing an operation on the first digital data word and outputting a first processed data word;

second stage circuitry coupled to the first stage circuitry for receiving the first processed data word and outputting a second processed data word;

processing control circuitry for controlling the processing stages so that a digital data word is received and processed by the first stage and, thereafter, by each successive stage in the circular arrangement so that when the processed digital data word is output by a last stage, the processed digital data word is transferred back to the first stage at least once before being finally output by the last stage;

a buffer coupled between the first and second stage circuitry for storing the first processed data word to suspend processing of the first digital data word; and control circuitry for causing the circular arrangement of two or more processing stages to begin processing a second digital data word and for later causing suspension of processing of the second digital data word and resuming processing of the first digital data word.

2. The digital processing device of claim 1, wherein the digital data word is one or more bits in width.

3. The digital processing device of claim 1, wherein the function is an arithmetic operation.

4. The digital processing device of claim 1, wherein the function is a logical operation.

5. The digital processing device of claim 1, wherein the first stage includes a data key input for receiving a cryptographic key to be applied to the data during processing.

6. The digital processing device of claim 5, wherein the digital processing device achieves an encryption function.

7. The digital processing device of claim 5, wherein the digital processing device achieves a decryption function.

8. The digital processing device of claim 1, further comprising:

multiple buffers coupled to the output of one or more of the processing stages.

9. The digital processing device of claim 8, wherein a group of multiple buffers is coupled to the output of the last stage.

10. The digital processing device of claim 9, further comprising a multiplexer coupled to the outputs of two or more of the multiple buffers so that one selected output from the two or more multiple buffers can be selected.

11. The digital processing device of claim 1, wherein a digital data word is part of a stream of encrypted video information.

12. A digital decryption device with the ability to suspend processing of a current data word, wherein the digital decryption device includes a plurality of stages of hardware circuitry arranged in a circular manner so that each stage's output is successively fed to a next stage's input, wherein a first stage receives a data word to be decrypted and wherein a last stage both outputs a data word back to the first stage and makes the output data word available as output data from the digital decryption device, the digital decryption device further comprising:

a buffer coupled between at least two stages to provide for storing of at least one stage's output, and for later selectively providing the stored at least one stage's output to a successive stage so that processing of a first digital data word can be suspended and processing of a second digital data word can commence, wherein the processing of the second digital data word can be suspended and the processing of the first digital data word can be resumed.

* * * * *